United States Patent [19]
Steffen

[11] 3,878,211

[45] Apr. 15, 1975

[54] PROCESS FOR THE MANUFACTURE OF 1,4-DIAMINOPHTHAIAZINE

[75] Inventor: Klaus-Dieter Steffen, Troisdorf-Oberlar, Germany

[73] Assignee: Dynamit Nobel AG, Troisdorf (Bez Koln), Germany

[22] Filed: Oct. 4, 1972

[21] Appl. No.: 295,036

[30] Foreign Application Priority Data
Oct. 28, 1971 Germany.............................. 2153693

[52] U.S. Cl. .......................... 260/250 P; 260/DIG. 2
[51] Int. Cl. ............................................. C07d 51/06
[58] Field of Search ..................... 260/250 P, 250 A

[56] References Cited
UNITED STATES PATENTS
3,813,384    5/1974    Vogelsang et al. ............... 260/250 P
FOREIGN PATENTS OR APPLICATIONS
4,211,070    6/1967    Japan .............................. 260/250 P
543,569      7/1957    Canada............................ 260/250 P
743,204      1/1956    United Kingdom ............. 260/250 P
1,064,303    4/1967    United Kingdom ............. 260/250 P OTHER PUBLICATIONS
Noller, Chemistry of Organic Compounds, W. B. Saunders, Philadelphia, 1965, pp. 275–276, QD. 253.N65.
Simpson, ed., Condensed Pyridazine and Pyrazine Rings, Interscience, 1953, p. 69, Q.D. 401.S59.
Armarego, J. Appl. Chem. LL, Feb. 1961, pp. 70–72.
Di Stefano, et al., Chemical Abstract, 68:78226b, (1968).

*Primary Examiner*—Alton D. Rollins
*Assistant Examiner*—Ralph D. McCloud
*Attorney, Agent, or Firm*—Burgess, Dinklage & Sprung

[57] ABSTRACT

In a process for the manufacture of 1,4-diaminophthalazine by the reaction of phthalonitrile with hydrazine, the improvement which comprises carrying out the reaction in the presence of sulfur or sulfides of alkaline metals or ammonium, preferably in the additional presence of a solvent of the reactants and a non-solvent of 1,4-diaminophthalazine.

6 Claims, No Drawings

PROCESS FOR THE MANUFACTURE OF 1,4-DIAMINOPHTHALAZINE

BACKGROUND OF THE INVENTION

1. Field of the Invention

This invention relates to a one-step process for the preparation of 1,4-diaminophthalazine. More particularly, this invention relates to the preparation of 1,4-diaminophthalazine from phthalonitrile and hydrazine. More especially, this invention is directed to the preparation of 1,4-diaminophthalazine from phthalonitrile wherein the 1,4-diaminophthalazine is recovered in high yields with good purity.

2. Discussion of the Prior Art

By 1,4-diaminophthalazine is meant, as the term is used herein, the hereinbelow compounds in accordance with the following three formulas, which compounds are in equilibrium with one another:

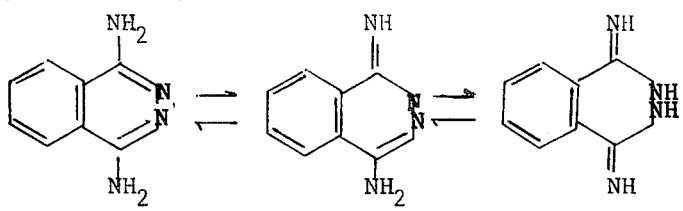

Pyridazine derivatives, including 1,4-diaminophthalazine, have a generally increasing importance in drug synthesis, as revealed by J. Druey, Angew. Chemie 70 (1958)5. Particularly, the hydrazinophthalazines are used as blood pressure reducing agents.

It is already known that 1,4-diaminophthalazine can be prepared from phthalonitrile and hydrazine hydrate in solution in methanol, such as disclosed by L. Di Stefano and R. N. Castle in J. Heterocyclic Chem. 5 (1968) 111. In the process described in that article, the disadvantage is that the yield of 40% is entirely unsatisfactory and is an obstacle to large-scale manufacture of the product.

SUMMARY OF THE INVENTION

Broadly, this invention contemplates an improvement in a process for the preparation of 1,4-diaminophthalazine by reaction of phthalonitrile with hydrazine, which improvement comprises carrying out the reaction in the presence of sulfur or the sulfides or polysulfides of alkaline metals or ammonium.

In a particularly desirable embodiment, this invention contemplates carrying out the above-described process in the presence of a solvent of the reactants and a non-solvent of the 1,4-diaminophthalazine. Generally speaking, the reaction can be carried out in the presence of sulfur or the alkaline metal sulfides or polysulfides, employing a molar ratio of phthalonitrile to hydrazine to sulfur within the range of 1:1:0.1 to 1:5:1. Temperatures between 60° and 160°C are suitable. Preferably the temperature is between 100° and 130°C. By using this method, yields of more than 90% are obtained. Additionally, the product that is synthesized is of high purity and can easily be separated from the other reaction components and by-products.

As indicated above, the process is preferably carried out in the presence of a solvent of the reactants, phthalonitrile and hydrazine. By this is meant at least 5 grams of phthalonitrile or hydrazine must be soluble in 100 cc of solvent. Preferably, at least 10 grams of phthalonitrile or hydrazine are soluble in 100 cc of solvent, all measured at the reaction temperature.

Similarly, by the term "non-solvent" of 1,4-diaminophthalazine is meant that the solvent does not dissolve more than 10 grams of 1,4-diaminophthalazine per 100 cc of solvent, determined at 20°C.

DESCRIPTION OF THE PREFERRED EMBODIMENTS

In the practical performance of the process, the procedure is generally first to dissolve hydrazine and phthalonitrile in the solvent and then to add the sulfur or sulfides to this solution. The reaction is exothermic and vigorous, with the formation of $NH_3$ and $H_2S$; it is therefore desirable, after the reaction has started, to cool the reaction vessel, and after the reaction has progressed to heat it to 160°C, preferably to 120°C, in order to assure a complete reaction. The end of the reaction is indicated by the cessation of the formation of $NH_3$ and $H_2S$. The duration of the reaction depends on the size of the batch and the temperature that develops.

In general, most of the phthalonitrile reacts within about one hour. It is entirely contemplated, however, to heat the reaction components to the stated temperatures for a period of several hours in order to make the reaction as complete as possible without the formation of appreciable amounts of by-products. After the reaction has ended, the solution is cooled, preferably to temperatures below 0°C, whereupon the 1,4-diaminophthalazine is precipitated.

The hydrazine is used preferably in the form of the hydrate ($NH_2$—$NH_2.H_2O$). Pure hydrazine can also be used in the same manipulative procedure.

The molar ratio of phthalonitrile to hydrazine to sulfur or sulfides can vary within wide limits. It can be between 1:1:0.1 and 1:5:1. However, it is preferable to select from a range between 1:1.6:0.2 and 1:4:0.8. If the proportion of hydrazine is increased, the sulfur is also to be increased. The higher the hydrazine and sulfur proportions are, the purer will be the reaction product.

The solvent is to be one in which the phthalonitrile and the hydrazine are soluble and the 1,4-diaminophthalazine that forms is poorly soluble or insoluble. Furthermore, the solvent, of course, must not react with the reaction components. These requirements are fulfilled by alkyl substituted amides which are fluid at room temperature, among others. The alkyl group involved is mainly $C_1$ to $C_4$ alkyls, preferably the methyl group and the ethyl group. By amides are meant both the acid amides of aliphatic carboxylic acids and nitrogenous, heterocyclic compounds in which the amide group is a component of the ring. Examples of suitable solvents, accordingly, are: dimethylformamide and diethylformamide, dimethylacetamide and diethylacetamide, N-methylpiperidone, N-methylpyrrolidone, N-ethylpyrrolidone, N-butylpyrrolidone. The use of N-methylpyrrolidone is preferred.

Other suitable solvents are: dioxane, tetrahydrofuran, benzene, methanol, ethanol, butanol or acetone or mixtures of these solvents with one another.

The crude reaction product obtained by the method of the invention is many times of an orange to red color due to intensely red colored traces of by-products. These impurities, which are probably tetrazine derivatives, are insoluble in water and can easily be removed by recrystallizing the crude 1,4-diaminophthalazine from water with the addition of small amounts of active charcoal.

1,4-diaminophthalazine, in contrast to other known aromatic diamines, is resistant to oxidation and can be stored for months without decomposition. It is a valuable intermediate for the manufacture of pharmaceutical products. 1,4-diaminophthalazine is bacteriostatically active; solutions of 0.3 to 0.06% in methanol inhibit the growth of e.g. bacteria coli or st. aureus.

EXAMPLES 1 to 3

64.1 g of phthalonitrile (0.5 mole) is dissolved together with the amount of hydrazine hydrate (100%) and sulfur given in the table in 300 ml of N-methylpyrrolidone, and carefully heated. The reaction is energetic and is accompanied by the formation of $NH_3$ and $H_2S$. After the development of gas has subsided, the solution is slowly heated up to 120°C. After a total reaction time of five hours, the solution is chilled overnight in a chest freezer, the precipitated crystals are filtered out, washed well with benzene and dried.

The following table gives, in Column 4, the yields of crude 1,4-diaminophthalazine, and in Column 5 the purity thereof, determined and estimated by the thin-layer chromatography method.

| Ex. | Hydrazine $H_2O$ (q) | Sulfur (q) | Crude yield of theory (%) | Purity of crude prod. (%) |
|---|---|---|---|---|
| 1 | 80.1 (1.6 mole) | 9.6 (0.3 mole) | 90.5 | 97 |
| 2 | 60.1 (1.2 mole) | 6.4 (0.2 mole) | 93.8 | 95 |
| 3 | 40.1 (0.8 mole) | 3.2 (0.1 mole) | 92.4 | 90 |

The crude products were then recrystallized from water with the addition of active charcoal and then had a purity of better than 99%.

From the above, it is seen that carrying out the reaction in the presence of sulfur there is produced 1,4-diaminophthalazine in high purity, i.e., a purity of at least 90%. Additionally, the yield of crude product based upon the maximum amount allowed by theory is in excess of 90%, i.e., well above the 40% provided by prior art processes. The use of a solvent such as N-methylpyrrolidone enables the ready separation of the 1,4-diaminophthalazine from the reaction medium.

1,4-diaminophthalazine reacts with hydrazine under formation of 1,4-dihydrazinophthalazine according to Austrian Patent Publication 177,422. 1,4-dihydrazinophthalazine is a hypotensive agent and is known under the trade name of "Dihydralazine."

I claim:

1. In a process for the preparation of 1,4-diaminophthalazine by reaction of phthalonitrile with hydrazine, the improvement which comprises the steps of carrying out the process in the presence of elemental sulfur, a sulfide or polysulfide of an alkaline metal or ammonium.

2. An improvement according to claim 1 wherein the sulfur is present such that the molar ratio of phthalonitrile to hydrazine to sulfur is in the range of 1:1:0.1 to 1:5:1.

3. An improvement according to claim 1 wherein the molar ratio of phthalonitrile to hydrazine to sulfur is within the range of 1:1.6:0.2 to 1:4:0.8.

4. An improvement according to claim 1 wherein the solvent is selected from the group consisting of dimethylformamide, diethylformamide, dimethylacetamide, diethylacetamide, N-methylpiperidone, N-methylpyrrolidone, N-ethylpyrrolidone, N-butylpyrrolidone, dioxane, tetrahydrofuran, benzene, methanol, ethanol, butanol, acetone, and mixtures of these solvents with one another.

5. An improvement according to claim 4 wherein the reaction is carried out at a temperature between 60° and 160°C.

6. An improvement according to claim 5 wherein the temperature is between 100° and 130°C.

* * * * *